United States Patent
Hähl

(10) Patent No.: US 7,034,778 B1
(45) Date of Patent: Apr. 25, 2006

(54) COLOR HEAD-UP DISPLAY, IN PARTICULAR FOR A VEHICLE

(75) Inventor: Manfred Hähl, Mühlheim (DE)

(73) Assignee: Mannesmann VDO AG, Frankfurt (DE)

( * ) Notice: Subject to any disclaimer, the term of this patent is extended or adjusted under 35 U.S.C. 154(b) by 730 days.

(21) Appl. No.: 09/628,922

(22) Filed: Jul. 31, 2000

(30) Foreign Application Priority Data

Apr. 5, 2000 (DE) .................... 100 16 817

(51) Int. Cl.
*G09G 5/00* (2006.01)

(52) U.S. Cl. .................... 345/7; 349/11; 359/630

(58) Field of Classification Search .......... 345/7, 345/8, 9, 82; 359/630, 618, 646, 709, 717; 349/11

See application file for complete search history.

(56) References Cited

U.S. PATENT DOCUMENTS

| | | | |
|---|---|---|---|
| 3,867,633 A | | 2/1975 | Patrick et al. |
| 4,298,869 A | * | 11/1981 | Okuno .................... 345/82 |
| 5,013,135 A | * | 5/1991 | Yamamura .................... 359/630 |
| 5,198,812 A | | 3/1993 | Probert |
| 5,200,844 A | | 4/1993 | Suvada |
| 5,557,353 A | * | 9/1996 | Stahl .................... 353/69 |
| 5,657,163 A | | 8/1997 | Wu et al. |
| 5,710,668 A | * | 1/1998 | Gohman et al. .................... 359/634 |
| 5,805,119 A | * | 9/1998 | Erskine et al. .................... 345/7 |
| 5,864,432 A | * | 1/1999 | Deter .................... 359/634 |
| 5,892,598 A | * | 4/1999 | Asakawa et al. .................... 359/13 |
| 5,909,182 A | * | 6/1999 | Van Alstine et al. .................... 340/815.52 |
| 6,100,943 A | * | 8/2000 | Koide et al. .................... 349/11 |
| 6,111,701 A | * | 8/2000 | Brown .................... 359/637 |
| 6,211,626 B1 | * | 4/2001 | Lys et al. .................... 315/291 |
| 6,259,423 B1 | * | 7/2001 | Tokito et al. .................... 345/76 |
| 6,292,305 B1 | * | 9/2001 | Sakuma et al. .................... 359/649 |
| 6,325,524 B1 | * | 12/2001 | Weber et al. .................... 362/245 |
| 6,346,771 B1 | * | 2/2002 | Salam .................... 313/499 |
| 6,359,737 B1 | * | 3/2002 | Stringfellow .................... 359/631 |
| 6,502,956 B1 | * | 1/2003 | Wu .................... 362/237 |
| 6,504,518 B1 | * | 1/2003 | Kuwayama et al. .................... 345/7 |
| 2001/0001241 A1 | * | 5/2001 | Kawakami et al. |

FOREIGN PATENT DOCUMENTS

| | | |
|---|---|---|
| DE | 3844701 | 4/1991 |
| EP | 0210088 | 1/1987 |
| WO | 9109477 | 6/1991 |
| WO | 9941785 | 8/1999 |

OTHER PUBLICATIONS

Saito et al. Japan Pub. No.: 06-172616.*
Patent Abstracts of Japan 07186777 A, Jul. 25, 1995, (Asahi Glass Co Ltd).

* cited by examiner

*Primary Examiner*—Regina Liang
*Assistant Examiner*—Jennifer T. Nguyen
(74) *Attorney, Agent, or Firm*—Martin A. Farber

(57) ABSTRACT

In a color head-up display, in particular for vehicles, in which the light from a light source (2) is transmitted through an at least partially light-transmitting display (3) and can be projected onto a windshield, a multiplicity of red, blue and green light-emitting diodes are arranged without packaging on a common support, and that a heat-dissipating device for cooling the light-emitting diodes is present.

4 Claims, 3 Drawing Sheets

COLOR HEAD-UP DISPLAY, IN PARTICULAR FOR A VEHICLE

FIELD AND BACKGROUND OF THE INVENTION

The invention relates to a color head-up display, in particular for a vehicle.

The prior art discloses color head-up displays having a wide variety of light sources, such as, for example, fluorescent lamps or halogen lamps, in which the light from the light source is transmitted through an at least partially light-transmitting display and can be projected onto a windshield. Halogen lamps have the disadvantage of a relatively short durability (approximately 500–1000 operating hours). Due to the installation position in head-up displays in motor vehicles, the lamps can be changed only by trained specialist personnel. In the case of fluorescent lamps, only a small part of the light energy can be used for illumination owing to the geometrical dimensions of the fluorescent lamp and the small usable region for a head-up display optical arrangement.

Furthermore, motor vehicle head-up displays require the light source to have a large dimming range, since the ambient brightness around the motor vehicle varies greatly depending on the time of day and the surroundings. Since the spectral properties of halogen and fluorescent lamps alter when the latter are dimmed, color-neutral dimming is possible at best with a high structural complexity with a corresponding space requirement.

SUMMARY OF THE INVENTION

The object of the invention, therefore, is to specify a color head-up display which is constructed compactly and can be dimmed in a wide range.

This object is achieved by virtue of the fact that a multiplicity of red, green and blue light-emitting diodes are arranged without packaging on a common support, and that a heat-dissipating device for cooling the light-emitting diodes is present. By dispensing with the otherwise customary packaging (housing of the light-emitting diodes), it is possible to arrange the individual light-emitting diodes very close together. A high luminance is achieved as a result of this, said luminance being required in order to transilluminate the display so that an optimum optical representation is obtained even under bright daylight conditions. The cooling device then protects the light-emitting diodes—arranged very close together—against thermal overloading.

The multiplicity of light-emitting diodes may be arranged in the form of a compact array. The compact array may be configured as a matrix, for example. This enables the bonding of the individual diodes to be carried out in a simple manner. It is also possible, for example, to configure the arrangement of the diodes in a spiral form or in the form of concentric circles lying one inside the other.

By virtue of the fact that the number of light-emitting diodes of one color is adapted to the spectral sensitivity of the eye and to the spectral efficiency of the diodes, the individual light-emitting diodes can be fully utilized for full desired luminous intensity in a specific hue, in particular for white light, since the different colors then cause an observer to experience approximately the same sensation of brightness and dimming of one or more color groups is not necessary, or is only necessary to a slight extent, in order to obtain the desired hue (in particular for desired white light).

By virtue of the fact that the compact array largely has a round form, the luminous intensity of the light-emitting diodes that are present can be fully utilized if the light is transmitted through a lens optical arrangement. In this way, material and, in particular, energy are saved and thus the evolution of heat by the light-emitting diodes is also reduced to the necessary extent.

The configuration of the compact array is particularly simple if the light-emitting diodes are configured as chip pads which are each applied on a metallic support material array and a connection of the light-emitting diode is electrically conductively connected thereto. In the case described above, the light-emitting diode can be supplied with electrical energy in a particularly simple manner if in each case one bonding wire is connected to the light-emitting diode and a further bonding wire is connected to the metallic support material array. This configuration makes it possible to realize a simple series circuit of a plurality of light-emitting diodes if the diodes which are simultaneously adjacent to the support material arrays are electrically insulated from one another.

By virtue of the fact that a plurality of light-emitting diodes are connected in series, the integrated circuit requires fewer external connections. Moreover, the risk of hot spots of individual light-emitting diodes is greatly reduced.

By virtue of the fact that a plurality of light-emitting diodes of one color are connected in series, the different colors can be dimmed differently and so a variety of colors can be represented with at the same time few external connections being required.

The use of a color liquid crystal display as the light-transmitting display in the abovementioned head-up displays enables a simple color representation, in particular when, in the case of the light source, the differently colored light-emitting diodes are driven in such a way that the light source emits white light.

The use of a monochrome liquid crystal display as the light-transmitting display in a head-up display with the light source described above requires only a simple liquid crystal display yet allows a color representation if the individual colors of the light-emitting diodes can be successively switched on and off in a rapid sequence and the observer receives a composite image on account of the inertia of his eyes.

BRIEF DESCRIPTION OF THE DRAWINGS

The invention is explained in more detail below with reference to the figures of the drawings, in which.

DETAILED DESCRIPTION OF THE PREFERRED EMBODIMENT

Figure 1:
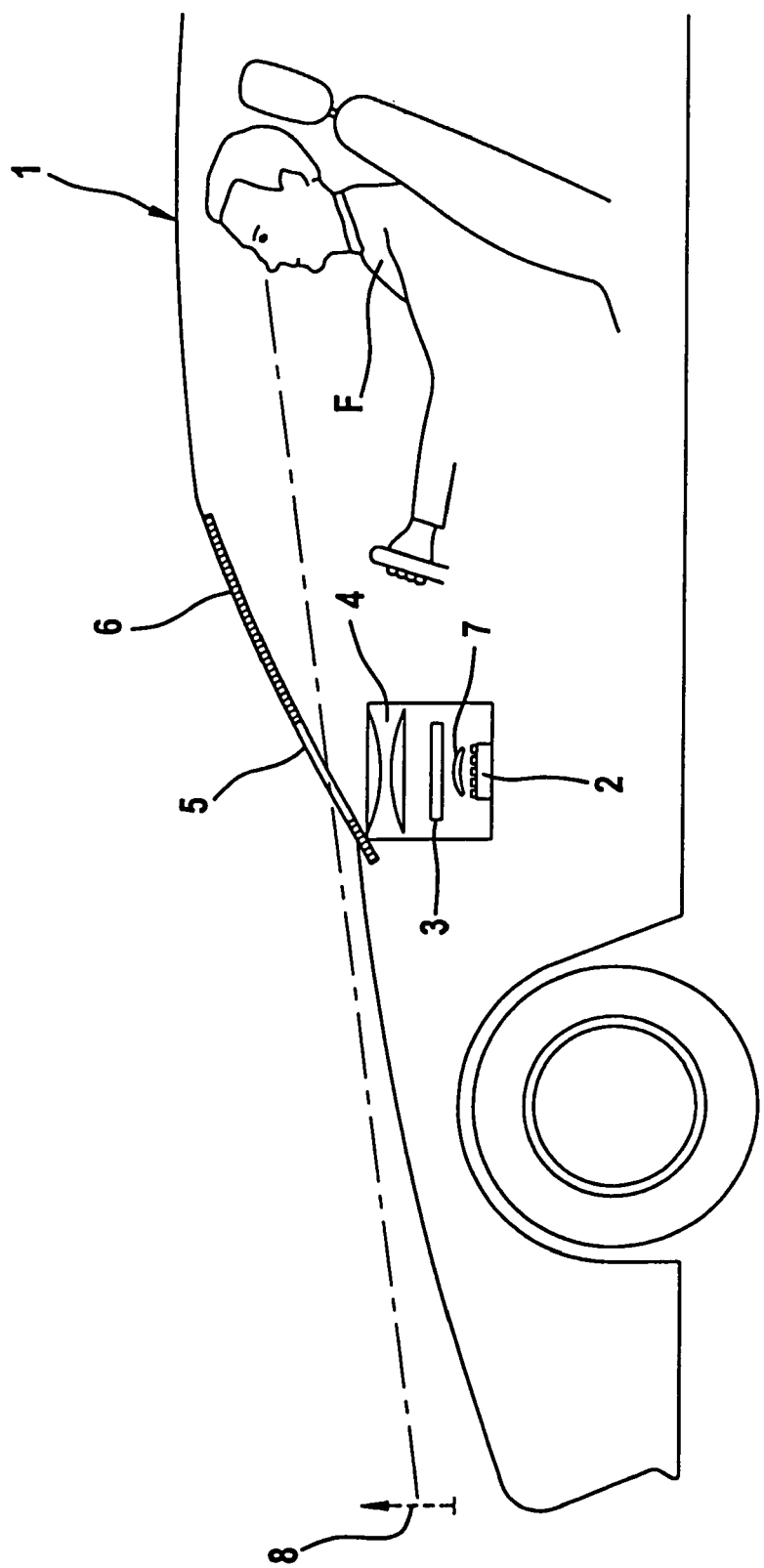
FIG. 1 shows an exemplary embodiment of a head-up display according to the invention in a motor vehicle.

FIG. 1 shows a basic illustration of a partly sectional side view of a head-up display used in a motor vehicle 1. This head-up display comprises a light source 2, a condenser lens 7, a liquid crystal display 3, a lens optical arrangement 4 and a projection region 5 on a front windshield 6 of the motor vehicle 1. The effect of the condenser lens 7 is that as much light as possible from the light source 2 reaches the liquid crystal display 3. A good light utilization factor can also be achieved e.g. by arranging the light source 2 in a concave mirror in such a way that virtually all the light rays emitted by the light source 2 pass directly or through reflection in the direction of the liquid crystal display 3. The liquid crystal display 3 is configured for example as a dot matrix on which an arrow is represented in the example. The light from the light source 2 is concentrated by the condenser lens 7, passes through the liquid crystal display 3 and is projected through the lens optical arrangement 4 onto the projection region 5 of the front windshield 6. A driver D of the motor vehicle 1 can thus perceive an arrow 8 with the remaining surroundings (not illustrated) in front of the vehicle. The lens optical arrangement 4 may also be dispensed with, depending on the arrangement of the light source 2, the display 3, the projection region 5 and, possibly, the condenser lens 7 or the concave mirror (not illustrated).

Figure 2:
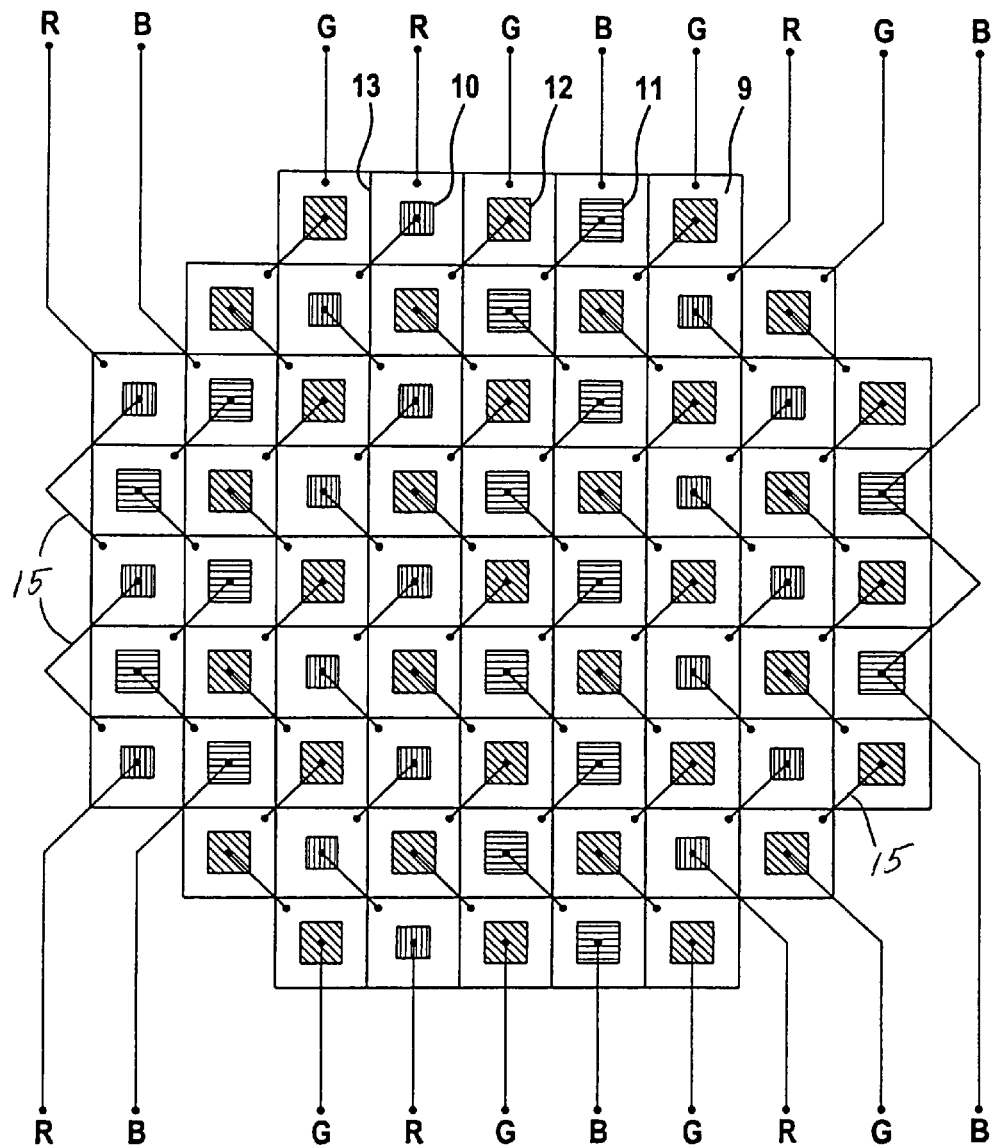
FIG. 2 shows the plan view of a particularly preferred example of a light source according to the invention.

The plan view of a particularly preferred exemplary embodiment of a particularly preferred light source 2 in FIG. 2 shows support material arrays 9, on which light-emitting diodes 10, 11, 12 are arranged in the form of chip pads and are electrically conductively connected to the support material arrays 9. The support material arrays 9 are DC-isolated from the support material arrays 9 that are adjacent to them by means of trenches 13 and are arranged in matrix form. The light-emitting diodes bearing the reference symbols 10 are red, those bearing the reference symbols 11 are blue and those bearing the reference symbols 12 are green. In each case a plurality of light-emitting diodes 10, 11, 12 of a respective color are connected in series in such a way that a bonding wire 15 is connected either to the LED chip pad 10, 11, 12 or to the support array 9. In this case, it is always a plurality of light-emitting diodes of one color which are connected in series. The respective end of the series is led to external connections R, G, B, the external connection R being connected to red light-emitting diodes, the external connection G being connected to green light-emitting diodes and the external connection B being connected to blue light-emitting diodes. By following the bonding wires starting at the external connections R, G, B, it can be seen that, of the 69 light-emitting diodes 10, 11, 12 illustrated, 19 are red light-emitting diodes 10, 16 are blue light-emitting diodes 11 and 34 are green light-emitting diodes 12. The comparatively high number of green light-emitting diodes 12 relative to the red and blue light-emitting diodes 10, 11 is due to the fact that the human eye perceives mixed light to be white when the light has a particularly high proportion of green light relative to low proportions of red and blue light.

It can be seen, moreover, that the arrangement of the light-emitting diodes 10, 11, 12 forms virtually a circular area. Light-emitting diodes outside this circular area would only increase the energy consumption and the evolution of heat without significantly improving the luminous efficiency if the light is transmitted through the condenser lens 7 illustrated in FIG. 1. A circle which can completely enclose the circular area may, for example, have a diameter of 6 millimeters. In the example illustrated, the edge lengths of the support arrays 9 are approximately 600 µm, those of the red light-emitting diode chip pads 10 are approximately 250 µm and those of the blue and green light-emitting diode chip pads 11, 12 are approximately 310 µm in each case. However, other dimensions are also conceivable. The light source 2 attains the required luminance as a result of the small diameter of the circular area and the high number of light-emitting diodes (69 in the present example). The configuration of the circular area could also be realized for example by arranging the adjacent diodes in the form of concentric circles lying one inside the other, or in the form of a spiral.

Figure 3:
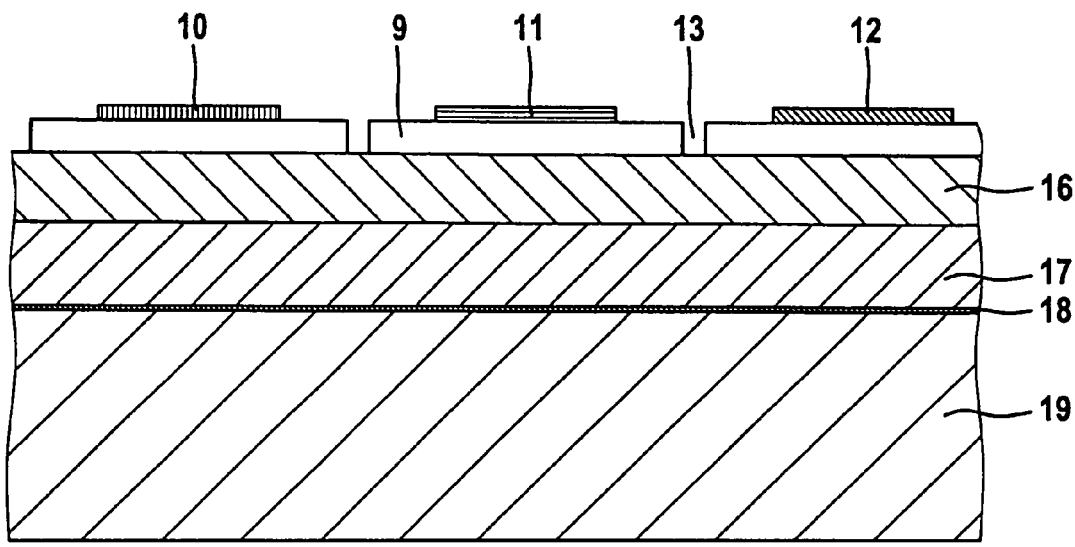
FIG. 3 shows a partial section through a particularly preferred example of a light source according to the invention.

The partial section through a light source 2 as illustrated in FIG. 3 reveals the light-emitting diodes 10, 11, 12 in the form of chip pads which are electrically conductively connected to metallic support material arrays 9 and are arranged on the latter. The support material arrays 9 are arranged on a thermally conductive electrical insulation layer 16. Beneath the insulation layer 16 there is additionally a further thermally conductive electrical insulation layer 17, for example made of silicon or ceramic, which is thermally conductively connected to a copper support 19, for example by means of a conductive adhesive or a soldering layer 18. The copper support 19 is simultaneously used for the purpose of uniform heat distribution in the light source 2 and thus for cooling purposes as well. The support 19 may also be produced from another material that is a good conductor of heat, and/or be connected to a heat sink.

By way of example, cooling of the light source 2 may also be realized by a fan or by a Peltier element.

Figure 4:
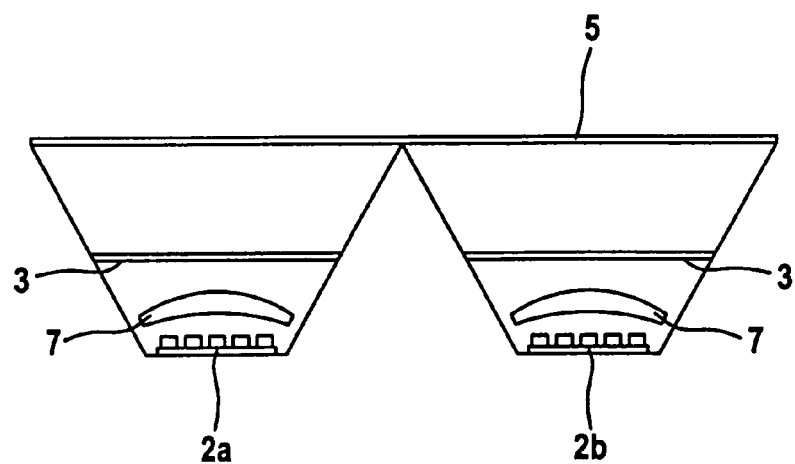
FIG. 4 shows the representation of a head-up display with a divided light source.

In FIG. 4, there are two light sources 2, which irradiate a respective display 3 via a respective condenser lens 7. This arrangement is expedient particularly when the height and width of the respectively desired display array 5 differ greatly from one another. The light from the light-emitting diodes that are present is thus better utilized. Furthermore, fewer problems arise on account of distortion, or distortion suppression can be realized more easily. It is also possible for a single display 3 to be irradiated by a plurality of light sources 2.

I claim:

1. A color head-up display, in particular for vehicles, in which the light from a light source (2) is transmitted through an at least partially light-transmitting display (3) and is projectable onto a windshield, wherein a multiplicity of red, a multiplicity of blue and a multiplicity of green light-emitting diodes (10–12) are arranged without packaging on a common support (16, 17, 19), and wherein a heat-dissipating device (19) for cooling the light-emitting diodes is present, wherein the number of light-emitting diodes of one color is adapted to the spectral sensitivity of the eye and to the spectral efficiency of the diodes.

2. A color head-up display, in particular for vehicles, in which the light from a light source (2) is transmitted through an at least partially light-transmitting display (3) and is projectable onto a windshield, wherein a multiplicity of red, a multiplicity of blue and a multiplicity of green light-emitting diodes (10–12) are arranged without packaging on a common support (16, 17, 19), and wherein a heat-dissipating device (19) for cooling the light-emitting diodes is present, wherein there are a plurality of displays (3) and a plurality of said light sources (2).

3. A color head-up display, in particular for vehicles, in which light from a light source is transmitted through an at least partially light-transmitting display and is projectable onto a windshield, wherein the light source comprises a multiplicity of red, a multiplicity of blue and a multiplicity of green light-emitting diodes arranged without packaging on a common support, and wherein the head-up display includes optical means for distributing light emitted by respective ones of the light-emitting diodes upon the at least partially light-transmitting display, and further includes a heat-dissipating device for cooling the light-emitting diodes, and wherein the light-emitting diodes of the various colors are selected by color in accordance with the spectral sensitivity of the eye to cause an observer to experience a sensation of brightness, thereby to accomplish a dimming of the head-up display.

4. A method of dimming a color head-up display, in particular for vehicles, in which display the light from a light source is transmitted through an at least partially light-transmitting display and is projectable onto a windshield, wherein the method includes steps:

of providing the light source with a multiplicity of red, a multiplicity of blue and a multiplicity of green light-emitting diodes, and arranging the light-emitting diodes withot packaging on a common support;

distributing light emitted by respective ones of the light-emitting diodes upon the at least partially light-transmitting display; and selecting individual ones of the light emitting diodes by color in accordance with the spectral sensitivity of the eye to cause an observer to experience a sensation of brightness, thereby to accomplish a dimming of the head-up display.

* * * * *